May 11, 1943.　　A. KLAMMT ET AL　　2,318,695
ASSEMBLING MACHINERY
Filed Oct. 28, 1939　　3 Sheets-Sheet 1
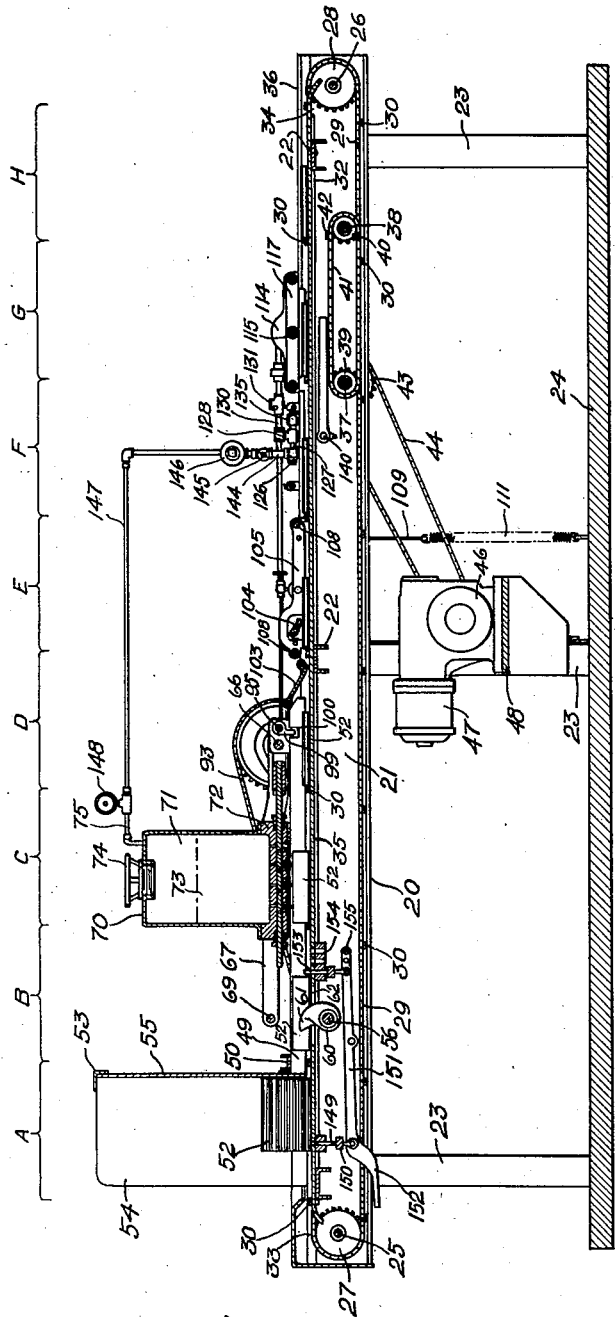
Fig. 1
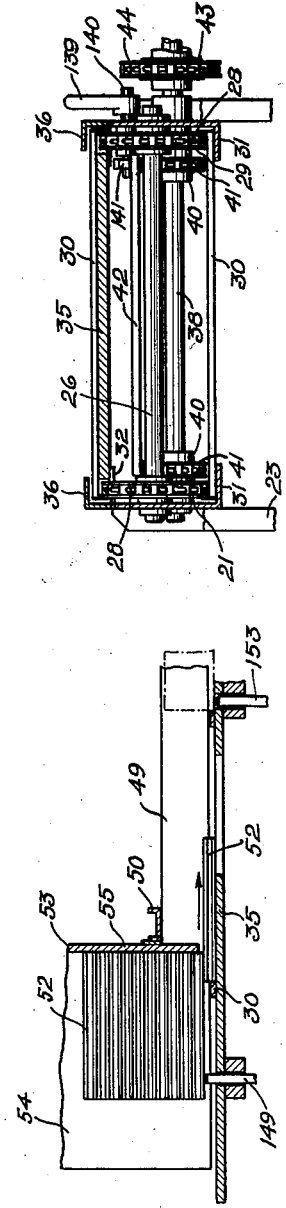
Fig. 2
Fig. 3
INVENTORS
*Arthur Klammt.*
*George W. Kretzschmar.*
BY
*Van Deventer + Grier*
ATTORNEYS

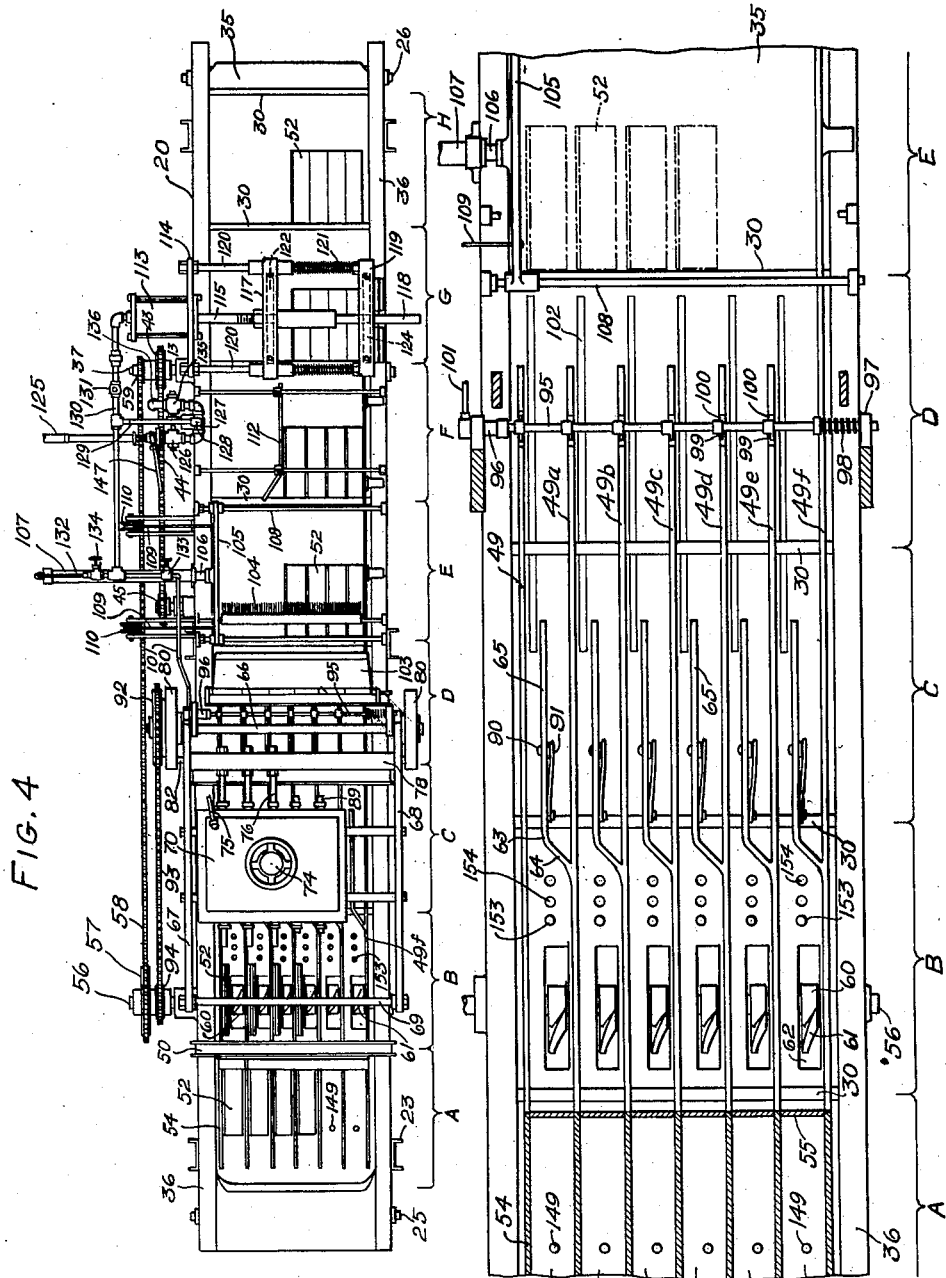

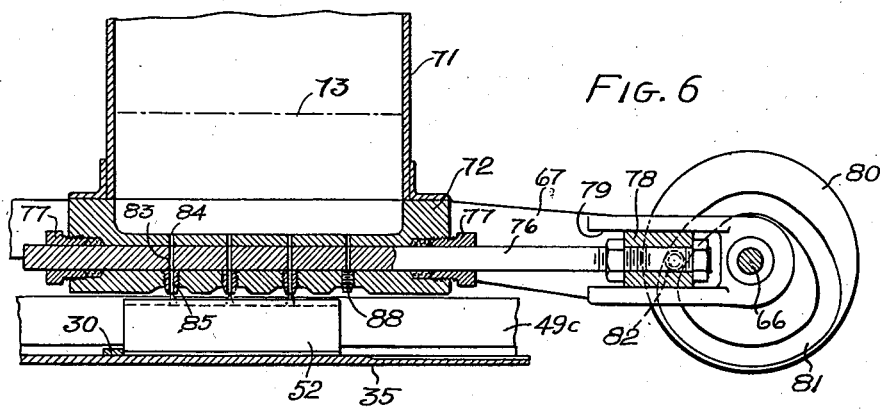

Patented May 11, 1943

2,318,695

UNITED STATES PATENT OFFICE 2,318,695

ASSEMBLING MACHINERY

Arthur Klammt, New York, N. Y., and George W. Kretzschmar, Garfield, N. J., assignors to W. M. Ritter Lumber Company, a corporation of West Virginia Application October 28, 1939, Serial No. 301,716

15 Claims. (Cl. 144—279)

This invention pertains to improvements in assembling machinery for applying spots of adhesive to pieces of material in spaced relation.

An object of the present invention is to provide improved means for applying adhesive and for automatically assembling individual pieces into composite groups.

A further object is to provide an automatic assembling machine adapted to the assembling of wood slats into groups suitable for use in parquet flooring.

Another object is to provide a machine of the above type including improved means for handling, controlling, and locating the slats during the spotting and assembling process.

Another object is to provide a machine of the above type which is readily adjustable for assembling different lengths and numbers of slats into suitable composite groups.

Other objects and advantages of the invention will appear during the course of the following description in connection with the accompanying drawings, in which Figure 1 is a longitudinal sectional view of the assembling machine;

Figure 2 is an enlarged fragmental end view of the same showing the conveying apparatus and frame structure;

Figure 3 is an enlarged fragmental section illustrating the control of the slats in the magazine;

Figure 4 is a plan view of the machine;

Figure 5 is an enlarged plan view of a portion of the conveyor platen, handling and positioning apparatus;

Figure 6 is a detail sectional view of a preferred form of the spotting mechanism;

Figure 7 is a detail cross section illustrating the spotting operation;

Figure 8 is an edge-wise view of a spotted slat;

Figure 9 is a detail front view of the second or main clamping head;

Figure 10 is a similar view illustrating a conveyor cleat under-running the main clamping plate;

Figure 11 is a detail view illustrating the operation of the pneumatic control valve; and Figure 12 is a detail sectional view of the throttling check valve.

Referring to Figure 1, the numeral 20 generally designates a frame comprising channel-shaped side members 21 secured to cross members 22 and provided with legs 23 mounted on a support 24, which support may be either the floor or suitable skids.

Two cross shafts 25 and 26 are journalled in the side members 21 respectively at the left or receiving and right or discharge ends of the frame 20.

Sprockets 27 and 28 on the shafts 25 and 26 carry endless chains 29, preferably of the roller type, to which are secured evenly spaced conveyor cleats 30, as shown in detail in Figure 2. Throughout the bottom reach of the chains 29 the cleats 30 are supported on the lower horizontal legs 31 of the side channels 21, the ends of upper horizontal legs 32 being cut away at 33 and 34 to provide room for the sprockets 27 and 28 and to allow the cleats and chains to approach and leave the sprockets.

Throughout the upper reach of the chains 29 the cleats 30 slide along a platen 35 suitably secured in the frame 20 with side clearance for the chains. Angular side rails 36, secured to the tops of channel members 21, overlie the chains 29 and ends of cleats 30 to guard the same and also serve as supports for various pieces of apparatus hereinafter described.

Second and third cross shafts 37 and 38, also journalled in the side members 21, carry small sprockets 39 and 40. Continuous chains 41 on the sprockets 39 and 40 have secured thereto a single cross cleat 42. The described parts are so located and proportioned that on the lower run of the chains 41 the cleat 42 rides on the lower channel legs 31 between the main conveyor chains 29. The shaft 37 is adapted to be driven continuously through an exterior sprocket 43, chain 44, and drive sprocket 45, Figure 4, from the speed-reducing gearing 46 of a motor 47, Figure 1, the motor and gearing being mounted on a cross bracket 48, secured to the central legs 23. It will be seen that during each complete circuit of the constantly-running chains 41 the cleat 42, moving to the left on its bottom travel, engages one of the cleats 30 on the main chain 29 and moves the latter to the left a distance equal to the inter-spacing of the cleats 30. By this means the entire system of main chains 29 and cleats 30 is moved intermittently, the cleats 30 travelling forward by steps from left to right along the platen 35, Figure 1.

A plurality of longitudinal guide rails 49, 49a, 49b, 49c, 49d, 49e and 49f held in position by suitable overlying cross members 50, Figures 1, 3 and 4, divide the space above the platen 35 into parallel lanes, 51, 51a, 51b, 51c, 51d and 51e as shown most clearly in Figure 5, in which figure the overlying cross members and other apparatus are omitted to more fully illustrate the underlying structure.

The guide rails 49, 49a, etc., are spaced just sufficiently above the platen 35 to allow the cleats 30 to move beneath the former, the height of the cleats being less than the thickness of a slat 52, as shown in Figures 1 and 3. For clarity in the following description, the longitudinal spaces between successive stop positions of the cleats 30, beginning at the left end of the platen 35, are hereinafter referred to as A, the loading station; B, the camming station; C, the spotting station; D, the kick-down station; E, the first assembling station; F, the final aligning station; G, the final assembling station; and H, the inspection or pre-discharge station.

A magazine 53, comprising vertical partitions 54 forming upward extensions of the guide rails 49, 49a, etc., is provided at station A, the end wall 55 of the magazine having its lower edge spaced above the platen 35 a distance only sufficient to allow the egress of a single flat-lying slat 52 at a time from each magazine stall as illustrated in Figure 3.

A cross shaft 56, located beneath station B and adapted to be continuously driven through a sprocket 57 and chain 58, Figure 4, from a sprocket 59 on the shaft 37 at the circuit speed of chain 41, carries a plurality of cams 60 having axially sloped lobes 61, Figures 1 and 5. Slots 62 are provided in the platen 35 above the cams 60, allowing the lobes 61 during part of their rotation to move up through the lanes between guide rails 49, 49a, etc., and to engage and tip or swing up on edge any slats resting in station B as shown in Figure 1.

Auxiliary guide rails 63, Figure 5, have angular portions 64 secured to the rails, 49a, 49b, etc., to facilitate the guiding of the edged-up slats into the narrow lanes defined by the straight portions 65. These narrow lanes are of a width slightly greater than the thickness of a slat 52. These narrow lanes extend through the greater portion of spotting position C.

A shaft 66, hereinafter referred to as the spotter shaft, extends cross-wise above the frame 20 in station D. A frame comprising side members 67 and 68 rotatably mounted around the bearings of the spotter shaft, and a terminal cross-bar 69, Figures 1, 4 and 6, has secured thereto the spotter 70, the latter overhanging the guide rails in station C.

The main members of the spotter 70 comprise an air-tight tank 71 mounted on a bottom valve-plate 72, shown in enlarged detail in Figure 6. The tank 71 is adapted to hold a quantity of viscous adhesive 73, preferably an aqueous diffusion of rubber, previously referred to in this specification. An air-tight filler cap 74, Figures 1 and 4, is provided in the top of the tank 71, and a pipe 75 is adapted to admit compressed air above the adhesive 73 from a suitable source as hereafter set forth in greater detail.

A plurality of plungers 76 are slidably mounted in sealing relation in the valve plate 72, these plungers extending longitudinally through the plate 72 above the narrow guide lanes in station C and being provided with suitable packing glands 77, Figure 6. The rear ends of the plungers 76 are secured in a common cross-head 78 which is slidable in guide-ways 79 in the frame members 67 and 68.

Inwardly facing box cams 80 on the shaft 66 have cam-grooves 81 engaging rollers 82 on the ends of the cross-head 78. The grooves 81 preferably comprise inner and outer circumferential portions of approximately 90 degrees of arc. By this construction it is evident that during one revolution of the shaft 66 the cross-head 78 and plungers 76 are moved through a forward and a rearward stroke, these parts remaining stationary at each end of their strokes during approximately 90 degrees of rotation of the shaft 66 and cams 80.

Vertical holes 83 in the plungers 76 are adapted to register simultaneously with passages 84 in the valve-plate 72 and with nozzles 85 extending through the bottom of the plate. The parts are so located that registry occurs at mid-stroke of the plungers in each direction, and as the ports register as described, the air pressure above the body of adhesive 73 causes a spurt of adhesive to be ejected from each nozzle 85 and deposited in the groove 86 of a slat 52 positioned under the nozzles as illustrated in Figures 6 and 7. The port and nozzle combinations described thus constitute spotting valves adapted to deposit spots 87 of adhesive in the groove 86 in spaced relation as shown in Figure 8, the spacing of course corresponding to the spacing of the nozzles 85. Obviously the device may be constructed with any desired spacing and number of valves for any desired lengths of slats, and when operating with short slats 52, as herein illustrated, unwanted valves may be disabled by replacing nozzles 85 with plugs 88, Figure 6. The groove of the end slat of a group forming a parquet block should not receive any spots of adhesive. By replacing the nozzles 85 above said end slat with plugs 88, the spotting is disabled for that particular groove.

In the embodiment shown, the machine is provided with six lanes, adapting it to the assembly of blocks of six slats, requiring five adhesive joints, and the spotter is accordingly constructed to accommodate five plungers 76 in the plate 72 and cross-head 78. However, the device is illustrated herein as assembling four-slat blocks, requiring only three adhesive joints, and during such operation two of the plungers 76 may be replaced with blank rods 89, Figure 4, or plugs 88 may be put in place of the nozzles 85 (as aforesaid) to disable the two additional sets of spotting valves.

Small buttons 90, Figures 5 and 7, are slidable through the auxiliary rails 63 and are pressed inward by flat springs 91. When slats 52 enter the lines under the spotter, they engage buttons 90 as shown in Figure 7, and the pressure and friction of the buttons hold the slats firmly against the rails 49c, etc., in proper lateral and longitudinal registry under the nozzles 85.

The spotter shaft 66 is driven via sprocket 92, chain 93 and sprocket 94 from the cam-shaft 56 at one-half the speed of the latter and of the drive-chain 41. Thus one spotting operation is provided following each feeding movement of the cleats 30, spotting being accomplished alternately by forward and backward strokes of the plungers 76. The amount of adhesive deposited in the spots 87 is a function of the speed of the plungers, the size of valve ports and nozzles, the viscosity of the adhesive and the air pressure on the latter. Various sizes of nozzles can be used, and the air pressure may be regulated as hereinafter set forth, to adjust the volume of the spots for any properly viscous adhesive.

A slidable rod 95, Figures 1, 4 and 5, is disposed laterally above the guide rails 49, 49a, etc., in the kick-down station D. One end of the rod 95 forms the plunger of a small pneumatic ram cylinder 96, the other end being slidably retained in a support 97. A compression spring 98 normally holds the plunger end of the rod in extreme inward position in the ram cylinder 96. Small kicker feet 99, normally project downward into notches 100 in the tops of guide rails 49, 49a, etc.

When slats 52 have been fed forward from spotting station C to station D, still in their edgewise vertical position, compressed air is admitted through a small pipe 101 to the cylinder 96, forcing the rod 95 outward against the compression of spring 98. The feet 99 engage the upper edges of the slats, thus kicking or tipping the latter sidewise (toward the front of the machine as seen in Figures 1 and 4) and down into flat horizontal positions between the guide rails. Shallow grooves 102 are provided in the platen 35 to receive the tongues of the slats to prevent the tongues from slipping sidewise prior to or during the kick-down operation.

As the slats 52 are fed forward by cleats 30 from kick-down station D to first assembling station E they pass under and engage a weighted swinging flap or apron 103 which presses them against the platen 35 to assure flatness and also exerts a frictional drag to align them evenly against their feeding cleat. In station E this aligning duty is taken up by a hinged wire brush 104 which presses evenly on all slats and prevents them from coasting out of contact with their feeding cleat 30 when the latter stops. In Figure 5 the brush 104 has been cut away to clarify the relationship of the underlying parts, as previously noted.

An assembling bar 105, arched to clear the brush 104 as shown in Figure 1, is centrally secured to a plunger 106 in a long pneumatic cylinder 107. The bar 105 is slidably guided on cross rods 108 and is normally held retracted as shown in Figures 4 and 5 by wire cables 109 running over pulleys 110, Figure 4, and secured to long tension springs 111, Figure 1.

It will be noted that all guide rails except the extreme side guide rail 49f terminate in station D. When a group of slats is fed forward into position E, therefore, they lie initially in separated relation as shown in dot and dash lines, Figure 5. Air is then admitted to the cylinder 107, causing the piston 106 to project the assembling bar 105 forward. The latter in its cross travel gathers the slats 52 and presses them together against the rail 49f with only sufficient pressure to lightly enter the tongues into the grooves. Air is then released from the cylinder 107, allowing the bar 105 to be retracted by the springs 111 and cables 109 to normal position, and leaving the partially assembled block of slats 52 resting against the rail 49f as shown in Figure 4.

As the next feeding operation starts and the block is carried forward toward station F the brush 104 continues to exert a frictional restraint which holds back and re-aligns any slat of the block which may have been slightly displaced forward in the first assembling operation described.

As the partially clamped or assembled block of slats 52 is fed into station F it is engaged with light side guiding pressure between side guide rail 49f and an adjustable parallel guide 112, Figure 4. This light side guiding pressure, together with the forward push of the cleat 30, assures final parallelism and alignment of the slats as the block is again fed forward into final assembling station G. This is due to the fact that the guide rail 112 and the cleat 30 are always at right angles with each other and mutually hold the slats of the block in perfectly square relationship with each other and with the motion of the cleat along the platen.

Station G is provided with a pneumatic ram 113 of relatively large cylinder diameter secured to the side frame members 36 and 21 by means of a yoke support 114. The ram 113 has a piston rod 115 adjustably secured in a cross-head 117, an extension rod 118 being slidably guided in a backing member 119 similar to the cross head and secured to the side member of the main frame 20. The cross-head 117 is slidably guided on cross rods 120 and is normally held retracted by compression springs 121 on the rods 120. The cross head 117 has vertically slidable therein a pressure shoe 122 suspended on headed bolts 123 as shown in detail in Figures 9 and 10. The shoe 122 is tapered on its left end, and normally hangs close to the platen 35 as in Figure 9, to firmly engage the side of the slat block. During a feeding operation, however, a cleat 30 engages the tapered end of the shoe 122, the latter then rising as shown in Figure 10 to allow the cleat to pass thereunder.

The backing member 119 is also equipped with a pressure shoe 124, Figure 4, but as this shoe is substantially the same in structure and arrangement as shoe 122, no further detailed description of shoe 124 is necessary herein.

When the block of slats 52 is fed into station G and comes to rest therein, air is admitted to the ram cylinder 113, forcing the cross-head 117 forward. The slats 52 of the block are pressed together between the shoes 122 and 124 with a relatively heavy pressure, firmly joining the tongues and grooves with their hinge-spots of adhesive and completing the final assembling operation. As the air is released from the ram-cylinder 113 the springs 121 force the cross-head 117 back to normal position, freeing the assembled block as shown in Figure 4.

The next feeding operation carries the block into an inspection station H, after which it is discharged from the end of the platen 35, to storage or to any desired machine for further processing, such for example as a machine for cutting tongues and grooves on the ends of the composite blocks.

Compressed air for use throughout the described process is supplied through a pipe 125, Figure 4, from any suitable source. The pipe line 125 leads to a spring plunger inlet valve 126, which latter is adapted when actuated to admit air to a short longitudinal conduit 127, thence through a vertical nipple 128, Figure 1, and a lateral pipe 129, Figure 4, to a longitudinal pipe line 130 connected at one end to the ram cylinder 113 through a check valve 131. The other end of line 130 is connected via branches 101 and 132 with the pneumatic cylinders 96 and 107 respectively. Valves 133 and 134 are provided in the branches 101 and 132 for use in regulating the action of the pneumatic rams if desired by throttling the air supply thereto.

A second spring-plunger type valve 135, Figures 1 and 4, is connected to the short conduit 127 and when operated is adapted to exhaust the air from the latter to the atmosphere through an open elbow 136.

The inlet and exhaust valves 126 and 135 are arranged opposite each other as shown in detail in Figure 11, the plungers 137 and 138 being directed inwardly toward each other. A flat finger lever 139 mounted on a rocker pin 140, projects upwardly between the plungers 137 and 138. The rocker pin 140 is journalled in the side frame member 21 as shown in Figure 1, but to clarify the relationship of the working parts the supporting frame member 21 is omitted from detail Figure 11. The inner end of pin 140 has secured thereto a lever 141 adapted to be engaged by the cleat 42 on the continuously moving chain 41. As the cleat 42 is carried upward over the sprocket 39 the cleat raises the lever 141 as shown in Figure 11, rocking the pin 140 counter-clockwise and causing the finger 134 to depress the plunger 137, thereby opening the inlet valve 126 and admitting compressed air to the various cylinders through the piping previously described.

When the cleat 42 clears the end of the lever 141 the latter drops by gravity, swinging the finger 139 clockwise to the position shown in dot and dash lines, Figure 11. By this operation the inlet valve 126 is allowed to close and the exhaust valve 135 is opened, releasing the air from the various pneumatic cylinders through the elbow 136.

The check valve 131 in the air line 139 to the large cylinder 113 is provided to throttle the exhaust of air from the latter. For this purpose the valve is constructed as shown in Figure 12. The valve member or swinging disk 142 has a small central orifice 143. Air moving toward the cylinder, that is in the direction of the arrow, passes freely past the valve member 142 which swings to allow its passage in the usual manner of a check valve. When the exhaust valve is opened, however, the member 142 swings shut, and the returning air is forced to pass through the small orifice 143. By this means the ram cylinder acts as a dash-pot against the expansion of the cross-head springs 121, causing the cross-head 117 to be returned to initial position without shock.

An upward branch 144 of the main air supply pipe 125 leads through a shut-off valve 145 and a pressure regulator 146 to a pipe 147 connected to the air pipe 75 of the spotter 70, as shown in Figure 1, this pipe line having been cut away in Figure 4 to avoid undue complication of the drawings. The regulator may be set to maintain any desired pressure in the spotter tank 71, a gauge 148 being provided to indicate the pressure.

It has been noted that the side members 67 and 68 of the spotter frame are rotatably mounted around the bearings of the spotter shaft 66. Due to this construction, after disconnecting the air pipe 75 the entire spotter mechanism may be swung upward about the center of shaft 66 for cleaning, changing nozzles, etc.

The operation of the machine, described above in detail at the various stations, may be briefly summarized as follows:

Slats 52 are loaded in the stalls of magazine 70, the slats being stacked flat with their grooved edges toward the near side of the machine, Figures 1, 3 and 4. A cleat 30 feeds one slat from each loaded stall into camming station B, where the cams 60 tip the slats upward on their tongued edges. The cleat then feeds the slats into the narrow guide lanes under the spotter in station C. The spotter deposits spaced spots of adhesive in the up-turned grooves of the slats.

The cleat 30 next advances the slats 52 to station D, where they are kicked down by the pneumatically actuated feet 99. Passing from station D to station E, the slats are flattened, restrained and aligned by the apron 103 and the wire brush 104. In station E the assembling bar 105 gathers and lightly assembles the various slats 52 into a composite block. Passing into station F the lightly assembled block is finally aligned. In station G the block is given a final heavy squeeze by means of the pneumatic ram 113 to complete the assembling operation, after which the completed block is moved through inspection station H and discharged.

When a slat 52 is slid under a stack in the magazine 53, unless the remainder of the stack is supported the rear of the latter will tip downward, possibly causing slats to slide backward from the stack. To prevent this occurrence, supporting pins 149 are provided, these pins being slidable vertically through the platen 35 in the magazine stalls. The pins 149 are attached to a common cross bar 150 and are movable by a rocker 151, Figure 1. A foot 152 on the rocker 151 is adapted to be engaged by cleats 30 on the feed chain 29. During the feeding operation, after an active cleat 30 has passed over the tops of pins 149 in pushing a slat 52 from the bottom of a stack, a lower cleat engages the foot 152, rocking the rocker 151 clockwise. This thrusts the pins 149 upward behind the feeding cleat 30 to support the rear of the stack as shown in Figure 3. This support is maintained until the feeding cleat 30 has moved clear of the magazine, when the foot 152 is released and withdraws the pins 149 downward to normal position as shown in Figure 1.

When the machine is operated at high speed there may be a tendency for slats 52 to coast forward in the camming station B after the feeding mechanism stops. To prevent the slats from coasting out of proper camming position, a row of stop pins 153 is attached to the front portion of the rocker 151. These pins normally project up through the platen 35 and serve to stop sliding of the slats at the end of feed. When the rocker 151 is moved as previously described to raise the supporting pins 149, the stop pins 153 are drawn downward into the platen 35, allowing the feeding cleats 30 to pass over them without interference. To allow for processing slats of various lengths, additional rows of holes 154 are provided to accommodate the pins 153 in different spacing positions, the rocker 151 being constructed with additional holes 155 for correspondingly different attachment of the stop pin assembly.

From the foregoing description it will be evident that the present invention provides a machine adapted to carry through the complete assembling process automatically and at high speed, discharging a completed composite block at each feeding interval; the slats being processed are positively governed and controlled throughout the process whereby any jamming or similar trouble is avoided. It is also evident that the machine is readily adaptable to assembling various lengths and numbers of slats.

While the invention has been described in preferred form, it is not limited to the exact structures set forth and illustrated as various changes and modifications may be made without departing from the scope of the appended claims.

What is claimed is:

1. In an assembling machine for tongue and groove slats in which said slats normally lie in a horizontal plane in combination, means for shifting pluralities of said slats into vertical planes with the grooves uppermost, spotting means to simultaneously deposit adhesive in said last-mentioned grooves, shifting means cooperative with said spotting means and in timed relation therewith for again shifting said pluralities of slats to said horizontal plane, and means to associate said slats together in tongue and groove relation and thereby form a composite block.

2. In an assembling machine for tongue and groove slats in which said slats normally lie in a horizontal plane and in which pluralities of the same are moved in steps therethrough, a stage in which mechanism is provided for simultaneously shifting all of the slats of a given plurality from said horizontal plane to a plurality of spaced vertical planes with the grooves uppermost, means for simultaneously depositing adhesive in the bottoms of a number of said grooves, and means for simultaneously swinging all said last-mentioned slats back into the horizontal plane after said adhesive is deposited in said grooves, thereby placing the slats in position to have succeeding operations performed thereon.

3. In an assembling machine for slats with interlocking edges in which said slats are normally placed in said machine in a plurality of stacks, means to feed one slat from the bottom of each stack, a stage in which mechanism is provided for shifting said fed slats from the common feeding plane to a plurality of spaced parallel planes angular therewith, with said edges uppermost to receive adhesive, means for depositing adhesive on most of said edges, means for returning said last slats to said common feeding plane, and means for moving said last slats to bring their interlocking edges into engagement, thereby forming a parquet block.

4. In an assembling machine for tongue and groove slats in which a plurality of stacks of said slats normally lies in a horizontal plane and in which pluralities of the same are moved in steps therethrough, one slat from each stack being simultaneously fed during each step, a stage in which mechanism including a plurality of spaced cams is provided for shifting said slats from said horizontal plane to a plurality of spaced vertical planes with the grooves uppermost, means for depositing spots of adhesive in the bottoms of all of said grooves except one, and means for swinging said slats back into the horizontal plane after said adhesive is deposited in said grooves, thereby placing the slats in position to be brought together with their adjacent tongues and grooves in engagement.

5. In an assembling machine for tongue and groove slats in which said slats normally lie in horizontal planes in a plurality of stacks, intermittently acting feeding means for simultaneously feeding one slat from each stack during each feeding step, intermittently effective means for simultaneously engaging and shifting the fed slats from said horizontal plane to a plurality of spaced vertical planes with the grooves uppermost, means for depositing adhesive in the bottoms of at least some of said grooves, and intermittent means for engaging and swinging said slats back into the horizontal plane after the adhesive is deposited in said grooves, thereby placing the slats in position to have succeeding operations performed thereon.

6. In an assembling machine for tongue and groove slats in which said slats normally lie in a horizontal plane and in which pluralities of the same are moved in steps therethrough, cam means for effecting the shifting of said slats from said horizontal plane to a plurality of vertical planes with the grooves uppermost, means for depositing adhesive in the bottoms of at least some of said grooves, and pneumatically-controlled means for swinging said slats back into the horizontal plane after the deposit of said adhesive, thereby placing the slats in position to have succeeding operations performed thereon.

7. An assembling machine according to claim 6 in which said slats are laterally engaged and firmly held in said vertical planes during the time said adhesive is deposited.

8. An assembling machine according to claim 6 in which spring means laterally engages and holds said slats in said vertical planes while said adhesive is being deposited.

9. The combination claimed in claim 1 wherein said associating means includes means to locate said slats in adjacent tongue-and-groove relationship, means to move said slats laterally into light engagement, means to accurately align said slats, and means to press said aligned slats into firm cohesive engagement.

10. In an assembling machine for slats, in combination, a platen, means to intermittently feed groups of slats along said platen through a plurality of successive processing stations, means in one of said stations to deposit adhesive on certain slats of each group, means in another station and operable by compressed air to lay the slats of each group in assembling relationship, means in another station and operable by compressed air to gather all said slats of each group into partial assembly engagement, means in another station and operable by compressed air to press all said slats of each group into final cohesive assembly, means including a common valve to admit compressed air simultaneously to all said compressed air operative means, and means operatively connected with said feeding means to actuate said valve.

11. The combination claimed in claim 10 wherein said feeding means includes endless chains carrying a plurality of spaced feeding cleats movable along said platen, and other endless chains, adapted to be operated at constant speed and carrying a single driving cleat adapted to successively engage said feeding cleats to move the same, and wherein said valve operating means includes a lever adapted to be engaged by said single driving cleat.

12. The combination claimed in claim 10 including a compressed air supply line leading to said valve, wherein said adhesive depositing means comprises means to apply predetermined pneumatic ejection pressure to said adhesive including a branch compressed air line connected to said supply line and a pressure-regulator in said branch line.

13. In an assebling machine for slats, in combination, a platen having a spotting station, a kick-down station and a first assembling station, a plurality of spaced feeding cleats adapted to intermittently move groups of slats throughout said stations in the order named, means in said spotting station to deposit spots of adhesive on upturned edges of said slats, means in said kick-down station to tip said slats into flat engagement with said platen, a hinged apron overlying part of said kick-down station and adapted to engage said slats during feed thereof from said kick-down into said first assembling station whereby flatness of said slats on said platen may be assured and maintained, a hinged brush overlying a part of said first assembling station and adapted to frictionally engage said slats to hold the same in alignment against said feeding cleats, and means including a transversely movable bar in said first assembling station to gather said frictionally aligned slats of each group transversely into partial engagement.

14. A machine according to claim 1, wherein said spotting means comprises a tank of adhesive, a plurality of nozzles, several means operating in definite intervals for placing said nozzles in communication with the adhesive in said tank, and means for disabling at least one of said several means and thereby preventing its nozzle from communication with the adhesive in said tank.

15. In an assembling machine for tongue and groove slats in which said slats normally lie in a horizontal plane, means for generally moving pluralities of said slats through said machine in steps in said horizontal plane, cam means for shifting said slats from the horizontal plane to a plurality of vertical planes during one of said steps to permit an operation to be performed on the upper edges of at least some of said slats, and means operating upon said last-mentioned slats, during a succeeding one of said steps, for returning said last slats to the horizontal plane to permit additional operations to be performed thereon.

ARTHUR KLAMMT.
GEORGE W. KRETZSCHMAR.